United States Patent
Cheng

(10) Patent No.: US 10,489,947 B2
(45) Date of Patent: Nov. 26, 2019

(54) MOBILE DEVICE, APPLICATION DISPLAY METHOD, AND NON-TRANSITORY COMPUTER READABLE STORAGE MEDIUM

(71) Applicant: HTC Corporation, Taoyuan (TW)

(72) Inventor: Cheng-Wei Cheng, Taoyuan (TW)

(73) Assignee: HTC Corporation, Taoyuan (TW)

( * ) Notice: Subject to any disclaimer, the term of this patent is extended or adjusted under 35 U.S.C. 154(b) by 590 days.

(21) Appl. No.: 15/064,617

(22) Filed: Mar. 9, 2016

(65) Prior Publication Data
US 2017/0262960 A1    Sep. 14, 2017

(51) Int. Cl.
G06F 3/048    (2013.01)
G06T 11/60    (2006.01)
G06F 9/50    (2006.01)

(52) U.S. Cl.
CPC ............ G06T 11/60 (2013.01); G06F 9/5016 (2013.01); *Y02D 10/22* (2018.01)

(58) Field of Classification Search
CPC .... H04N 19/423; G06F 17/211; G06F 3/0481
See application file for complete search history.

(56) References Cited

U.S. PATENT DOCUMENTS

| | | | |
|---|---|---|---|
| 7,302,648 B1 * | 11/2007 | Brunner | G06F 9/4443 715/788 |
| 2012/0154410 A1 | 6/2012 | Baik et al. | |
| 2012/0162266 A1 * | 6/2012 | Douglas | G06F 3/0481 345/677 |
| 2013/0111333 A1 * | 5/2013 | Taleghani | G06F 17/211 715/252 |

FOREIGN PATENT DOCUMENTS

| | | |
|---|---|---|
| CN | 101599007 A | 12/2009 |
| CN | 102929922 A | 2/2013 |
| CN | 104808782 A | 7/2015 |
| TW | 200933522 A | 8/2009 |
| TW | 201314670 A | 4/2013 |
| TW | 201504922 A | 2/2015 |
| TW | 201506604 A | 2/2015 |

OTHER PUBLICATIONS

Corresponding Taiwan office action dated Jan. 24, 2018.

* cited by examiner

*Primary Examiner* — Haoshian Shih
(74) *Attorney, Agent, or Firm* — CKC & Partners Co., LLC

(57) ABSTRACT

A display method includes requesting a memory to allocate a first memory space for the first application corresponding to a first adjusted size adjusted from a first default size of a first destination frame of the first application, requesting the memory to allocate a second memory space for the second application corresponding to a second default size of a second destination frame of the second application, synthesizing a first application image generated in the first memory space and a second application image generated in the second memory space, and controlling a display component to display the display image.

20 Claims, 5 Drawing Sheets

MOBILE DEVICE, APPLICATION DISPLAY METHOD, AND NON-TRANSITORY COMPUTER READABLE STORAGE MEDIUM

BACKGROUND

Technical Field

The present disclosure relates to an electronic device, a method, and a non-transitory computer readable storage medium. More particularly, the present disclosure relates to a mobile device, a display method, and a non-transitory computer readable storage medium.

Description of Related Art

With advances in electronic technology, mobile devices, such as smart phones and tablet computers, are being increasingly used.

A typical mobile device may have a plurality of applications. The mobile device displays images of the applications that are in use. However, the sizes of the images of the applications are usually increased in a manner corresponding to the increase of the display resolution of the mobile device. The higher the sizes of the images of the applications, the heavier the loading of the memory and the processor. This results in a considerable resource in the mobile device being occupied.

SUMMARY

One aspect of the present disclosure is related to a mobile device. In accordance with one embodiment of the present disclosure, the mobile device includes a memory, a display component, and a processing component. The processing component is electrically connected to the memory and the display component. The processing component is configured to execute a first application, a second application, a window manager, and an image synthesizer; determine, through the window manager, a first default size of a first destination frame of the first application and a second default size of a second destination frame of the second application; request, through the window manager, the memory to allocate a first memory space for the first application corresponding to a first adjusted size adjusted from the first default size; request, through the window manager, the memory to allocate a second memory space for the second application corresponding to the second default size; generate, through the first application, a first application image with the first adjusted size in the first memory space; generate, through the second application, a second application image with the second default size in the second memory space; synthesize, through the image synthesizer, the first application image with the first adjusted size and the second application image with the second default size to generate a display image; and control the display component to display the display image.

In accordance with one embodiment of the present disclosure, the processing component is further configured to enlarge, through the image synthesizer, the first application image to generate an enlarged image; and compose, through the image synthesizer, the display image by combining the enlarged image and the second application image.

In accordance with one embodiment of the present disclosure, the processing component is further configured to provide, through the window manager, scalable information to the first application; provide, through the first application, an adjusting ratio to the window manager in response to the scalable information; and calculate, through the window manager, the first adjusted size according to the first default size and the adjusting ratio.

In accordance with one embodiment of the present disclosure, the processing component is further configured to provide, through the window manager, the adjusting ratio to the image synthesizer; enlarge, through the image synthesizer, the first application image to generate an enlarged image according to the adjusting ratio: and compose, through the image synthesizer, the display image by combining the enlarged image and the second application image.

In accordance with one embodiment of the present disclosure, the first default size is equal to a size of the enlarged image.

In accordance with one embodiment of the present disclosure, the processing component is further configured to detect a loading of the memory; request the memory to allocate a third memory space for the first application corresponding to the first default size under a case that the loading of the memory is lower than a predetermined memory threshold before requesting the memory to allocate the first memory space for the first application; and release the third memory space under a case that the loading of the memory is greater than the predetermined memory threshold to request the memory to allocate the first memory space for the first application corresponding to the first adjusted size.

In accordance with one embodiment of the present disclosure, the processing component is further configured to detect a battery power of the mobile device; request the memory to allocate a third memory space for the first application corresponding to the first default size under a case that the battery power of the mobile device is greater than a predetermined power threshold before requesting the memory to allocate the first memory space for the first application; and release the third memory space under a case that the battery power of the mobile device is lower than the predetermined power threshold to request the memory to allocate the first memory space for the first application corresponding to the first adjusted size.

Another aspect of the present disclosure is related to a display method. In accordance with one embodiment of the present disclosure, the display method includes executing a first application, a second application, a window manager, and an image synthesizer; determining, through the window manager, a first default size of a first destination frame of the first application and a second default size of a second destination frame of the second application; requesting, through the window manager, a memory to allocate a first memory space for the first application corresponding to a first adjusted size adjusted from the first default size; requesting, through the window manager, the memory to allocate a second memory space for the second application corresponding to the second default size; generating, through the first application, a first application image with the first adjusted size in the first memory space; generating, through the second application, a second application image with the second default size in the second memory space; synthesizing, through the image synthesizer, the first application image with the first adjusted size and the second application image with the second default size to generate a display image; and controlling a display component to display the display image.

In accordance with one embodiment of the present disclosure, the operation of synthesizing the first application image with the first adjusted size and the second application image with the second default size to generate the display image includes enlarging, through the image synthesizer, the first application image to generate an enlarged image; and composing, through the image synthesizer, the display image by combining the enlarged image and the second application image.

In accordance with one embodiment of the present disclosure, the display method further includes providing, through the window manager, scalable information to the first application; providing, through the first application, an adjusting ratio to the window manager in response to the scalable information; and calculating, through the window manager, the first adjusted size according to the first default size and the adjusting ratio.

In accordance with one embodiment of the present disclosure, the display method further includes providing, through the window manager, the adjusting ratio to the image synthesizer. The operation of synthesizing the first application image with the first adjusted size and the second application image with the second default size to generate the display image includes enlarging, through the image synthesizer, the first application image to generate an enlarged image according to the adjusting ratio; and composing, through the image synthesizer, the display image by combining the enlarged image and the second application image.

In accordance with one embodiment of the present disclosure, the first default size is equal to a size of the enlarged image.

In accordance with one embodiment of the present disclosure, the display method further includes detecting a loading of the memory, and requesting the memory to allocate a third memory space for the first application corresponding to the first default size under a case that the loading of the memory is lower than a predetermined memory threshold before requesting the memory to allocate the first memory space for the first application. The operation of requesting the memory to allocate the first memory space for the first application corresponding to the first adjusted size adjusted from the first default size includes releasing the third memory space under a case that the loading of the memory is greater than the predetermined memory threshold to request the memory to allocate the first memory space for the first application corresponding to the first adjusted size.

In accordance with one embodiment of the present disclosure, the display method further includes detecting a battery power of the mobile device, and requesting the memory to allocate a third memory space for the first application corresponding to the first default size under a case that the battery power of the mobile device is greater than a predetermined power threshold before requesting the memory to allocate the first memory space for the first application. The operation of requesting the memory to allocate the first memory space for the first application corresponding to the first adjusted size adjusted from the first default size includes releasing the third memory space under a case that the battery power of the mobile device is lower than the predetermined power threshold request the memory to allocate the first memory space for the first application corresponding to the first adjusted size.

Another aspect of the present disclosure is related to a non-transitory computer readable storage medium. In accordance with one embodiment of the present disclosure, the non-transitory computer readable storage medium is for storing a computer program, which, when executed, causes a processing component to perform operations including: executing a first application, a second application, a window manager, and an image synthesizer; determining, through the window manager, a first default size of a first destination frame of the first application and a second default size of a second destination frame of the second application; requesting, through the window manager, a memory to allocate a first memory space for the first application corresponding to a first adjusted size adjusted from the first default size; requesting, through the window manager, the memory to allocate a second memory space for the second application corresponding to the second default size; generating, through the first application, a first application image with the first adjusted size in the first memory space; generating, through the second application, a second application image with the second default size in the second memory space; synthesizing, through the image synthesizer, the first application image with the first adjusted size and the second application image with the second default size to generate a display image; and controlling a display component to display the display image.

In accordance with one embodiment of the present disclosure, the operation of synthesizing the first application image with the first adjusted size and the second application image with the second default size to generate the display image includes enlarging, through the image synthesizer, the first application image to generate an enlarged image; and compose, through the image synthesizer, the display image by combining the enlarged image and the second application image.

In accordance with one embodiment of the present disclosure, the operations further include providing, through the window manager, scalable information to the first application; providing, through the first application, an adjusting ratio to the window manager in response to the scalable information; and calculating, through the window manager, the first adjusted size according to the first default size and the adjusting ratio.

In accordance with one embodiment of the present disclosure, the operations further include providing, through the window manager, the adjusting ratio to the image synthesizer. The operation of synthesizing the first application image with the first adjusted size and the second application image with the second default size to generate the display image includes enlarging, through the image synthesizer, the first application image to generate an enlarged image according to the adjusting ratio; and composing, through the image synthesizer, the display image by combining the enlarged image and the second application image.

In accordance with one embodiment of the present disclosure, the operations further include detecting a loading of the memory, and requesting the memory to allocate a third memory space for the first application corresponding to the first default size under a case that the loading of the memory is lower than a predetermined memory threshold before requesting the memory to allocate the first memory space for the first application. The operation of requesting the memory to allocate the first memory space for the first application corresponding to the first adjusted size adjusted from the first default size includes releasing the third memory space under a case that the loading of the memory is greater than the predetermined memory threshold to request the memory to allocate the first memory space for the first application corresponding to the first adjusted size.

In accordance with one embodiment of the present disclosure, the operations further include detecting a battery power of the mobile device, and requesting the memory to allocate a third memory space for the first application corresponding to the first default size under a case that the battery power of the mobile device is greater than a predetermined power threshold before requesting the memory to allocate the first memory space for the first application. The operation of requesting the memory to allocate the first memory space for the first application corresponding to the first adjusted size adjusted from the first default size includes releasing the third memory space under a case that the battery power of the mobile device is lower than the predetermined power threshold request the memory to allocate the first memory space for the first application corresponding to the first adjusted size.

Through the operations of one embodiment described above, the memory consumption of the first application can be reduced.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
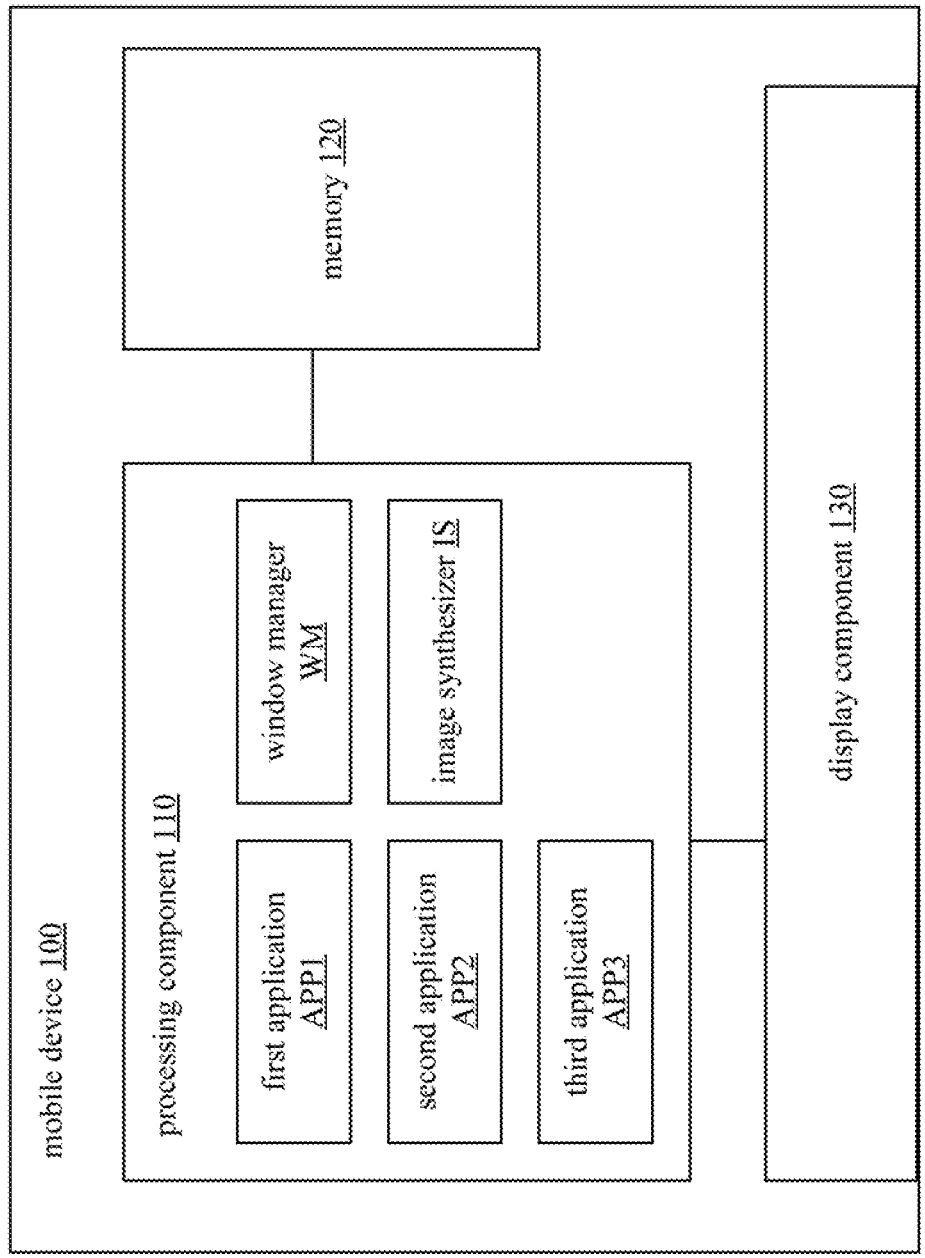
FIG. 1 is a schematic block diagram of a mobile device in accordance with one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below" "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

One aspect of the present disclosure is related to a mobile device. In the paragraphs below, a smart phone will be taken as an example to describe details of the mobile device. However, the present disclosure is not limited to the embodiment described below.

FIG. 1 is a schematic block diagram of a mobile device 100 in accordance with one embodiment of the present disclosure. In this embodiment, the mobile device 100 includes a processing component 110, a memory 120, and a display component 130. In this embodiment, the processing component 110 is electrically connected to the memory 120 and the display component 130.

In one embodiment, the processing component 110 can be realized by, for example, a processor, such as a central processor or a microprocessor, but is not limited in this regard. The display component 130 can be realized by, for example, a display, such as a liquid crystal display, an active matrix organic light emitting display (AMOLED), or an e-paper display, but is not limited in this regard.

In one embodiment, the processing component 110 is configured to perform programs to execute a first application APP1, a second application APP2, a third application APP3, a window manager WM, and an image synthesizer IS. It should be noted that the number of the applications in this embodiment is merely for illustration, and another number of the applications is within the contemplated scope of the present disclosure.

In one embodiment, the processing component 110 acquires a display resolution (e.g., 2560*1440) of the display component 130. In one embodiment, the processing component 110 uses the window manager WM to determine the locations and default sizes of destination frames of the applications APP1-APP3 according to the display resolution of the display component 130, which images generated by the applications APP1-APP3 will be respectively displayed within each of the destination frames. In one embodiment, the processing component 110 uses the window manager WM to request the memory 120 to allocate memory spaces for the applications APP1-APP3 according to the default sizes and at least one adjusted size adjusted from (e.g., reduced from) at least one of the default sizes of the applications APP1-APP3.

In one embodiment, the applications APP1-APP3 generate the application images in the allocated memory spaces. In one embodiment, the processing component 110 uses the image synthesizer IS to synthesize the application images to generate a display image corresponding to the locations and the default sizes of the destination frames, Subsequently, the processing component 110 can control the display component 130 to display the display image.

Through such operations, the memory 120 can allocate at least one adjusted memory space for at least one of the applications APP1-APP3, so that the memory consumption of the applications can be reduced.

Details of the present disclosure are described in the paragraphs below with reference to a display method in FIG. 2. However, the present disclosure is not limited to the embodiment below.

It should be noted that the display method can be applied to a mobile device having a structure that is the same as or similar to the structure of the mobile device 100 shown in FIG. 1. To simplify the description below, the embodiment shown in FIG. 1 will be used as an example to describe the display method according to an embodiment of the present disclosure. However, the present disclosure is not limited to application to the embodiment shown in FIG. 1.

It should be noted that, in some embodiments, the display method may be implemented as a computer program. When the computer program is executed by a computer, an electronic device, or the processing component 110 in FIG. 1, this executing device performs the display method. The computer program can be stored in a non-transitory computer readable medium such as a ROM (read-only memory), a flash memory, a floppy disc, a hard disc, an optical disc, a flash disc, a tape, a database accessible from a network, or any storage medium with the same functionality that can be contemplated by persons of ordinary skill in the art to which this invention pertains.

In addition, it should be noted that in the operations of the following display method, no particular sequence is required unless otherwise specified. Moreover, the following operations also may be performed simultaneously or the execution times thereof may at least partially overlap.

Furthermore, the operations of the following display method may be added to, replaced, and/or eliminated as appropriate, in accordance with various embodiments of the present disclosure.

Figure 2:
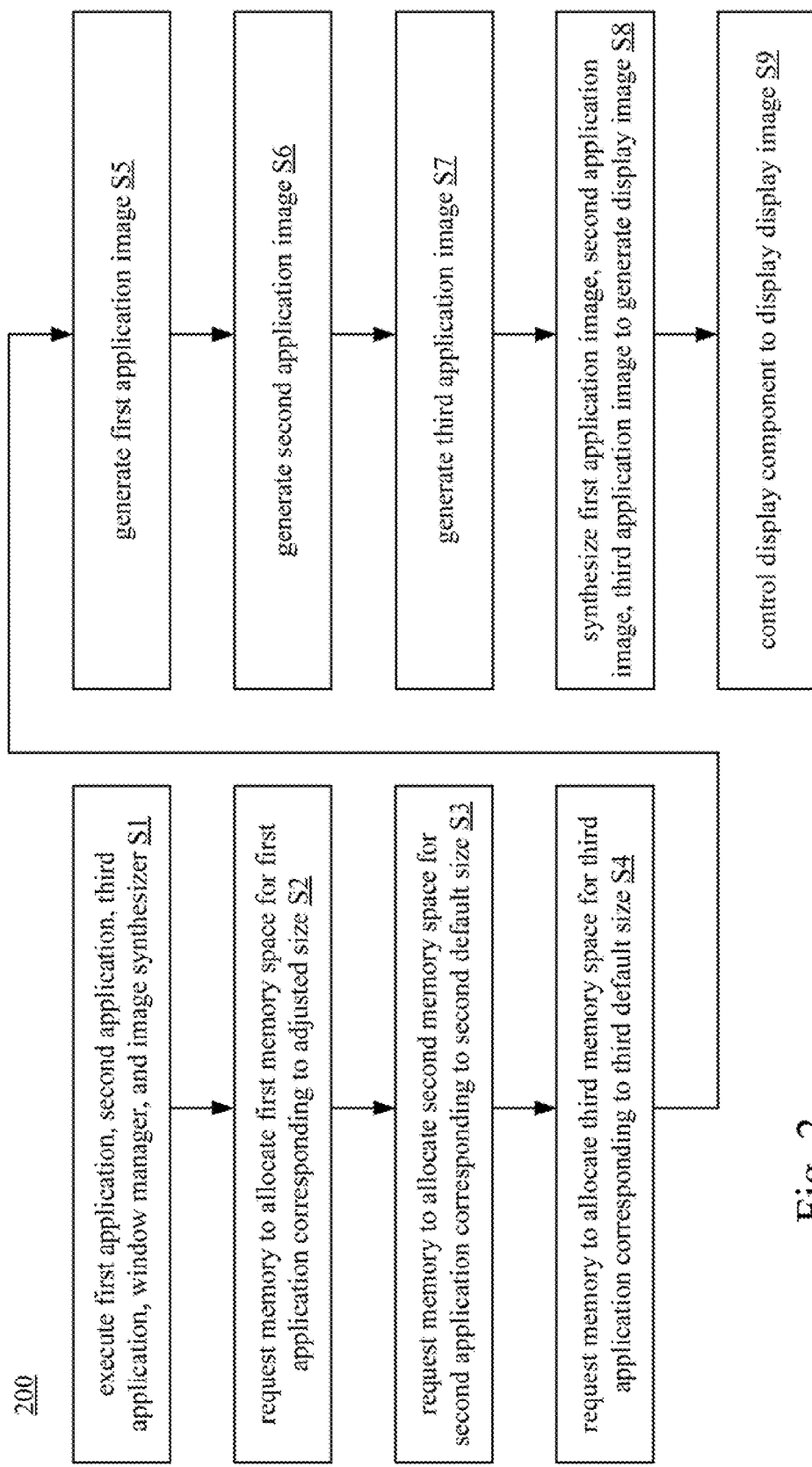
FIG. 2 is a flowchart of a display method in accordance with one embodiment of the present disclosure.

Reference is made to FIGS. 1 and 2. The display method 200 includes the operations below.

In operation S1, the processing component 110 executes a first application APP1, a second application APP2, a third application APP3, a window manager WM, and an image synthesizer IS. In one embodiment, from the very start, the processing component 110 determines the locations of destination frames of the applications APP1-APP3 by the window manager WM. In one embodiment, the processing component 110 determines, through the window manager WM, a first default size of the destination frame of the first application APP1, a second default size of the destination frame of the second application APP2, and a third default size of the destination frame of the second application APP3 according to the display resolution of the display component 130. For example, the display resolution of the display component 130 may be a size of 2560*1440, the first default size may be a size of 2000*1440, the second default size may be a size of 200*1440, and the third default size may be a size of 360*1440.

In operation S2, the processing component 110 requests, through the window manager WM, the memory 120 to allocate a first memory space for the first application APP1 corresponding to the first adjusted size adjusted from the first default size. In one embodiment, the first default size may be equal to the size of 2000*1440, and the first adjusted size may be equal to a size of 1500*1080.

In one embodiment, the processing component 110 provides scalable information, through the window manager WM, to the first application APP1 indicating that the processing component 110 supports the operations corresponding to allocate an adjusted memory space for the applications APP1-APP3. In response to the scalable information, the first application APP1 may provide an adjusting ratio (e.g., 0.75) back to the window manager WM, so as to allow the window manager WM to calculate the first adjusted size according to the first default size and the adjusting ratio. For example, the first adjusted size may be equal to a size of 1500*1080 calculated from (2000*0.75)*(1440*0.75).

In operation S3, the processing component 110 requests the memory 120 to allocate a second memory space for the second application APP2 corresponding to the second default size using the window manager WM therein.

In one embodiment, the processing component 110 uses the window manager WM to provide the scalable information to the second application APP2. In response to the scalable information, the second application APP2 may provide an adjusting ratio (e.g., 1) back to the window manager WM, so that the window manager WM can request the second memory space corresponding to the second default size.

In operation S4, the processing component 110 requests the memory 120 to allocate a third memory space for the third application APP3 corresponding to the third default size using the window manager WM therein.

In one embodiment, the processing component 110 uses the window manager WM to provide the scalable information to the third application APP3. In one embodiment, the third application APP3 may not support the scaling operations and not recognize the scalable information, so the third application APP3 does not respond to the scalable information. Therefore, the window manager WM requests the third memory space corresponding to the third default size.

In operation S5, the processing component 110 uses the first application APP1 to generate a first application image with the first adjusted size in the first memory space.

In operation S6, the processing component 110 uses the second application APP2 to generate a second application image with the second default size in the second memory space.

In operation S7, the processing component 110 uses the third application APP3 to generate a third application image with the third default size in the third memory space.

In operation S8, the processing component 110 uses the image synthesizer IS to synthesize the first application image with the first adjusted size, the second application image with the second default size, and the third application image with the second default size to generate a display image.

In one embodiment, the window manager WM may provide the adjusting ratio to the image synthesizer IS. In one embodiment, the image synthesizer IS may enlarge the first application image to generate an enlarged image according to the adjusting ratio (e.g., 0.75). Subsequently, the image synthesizer IS composes the display image by combining the enlarged image, the second application image, and the third application image. In one embodiment, the size of the enlarged image is equal to the first default size. For illustration, the size of the first application image may be a size of 1500*1080, the size of the enlarged image may be a size of 2000*1440 calculated from (1500/0.75)*(1080/0.75), the size of the second application image may be a size of 200*1080, the size of the third application image may be a size of 360*1080, and the size of the display image may be a size of 2560*1440.

In operation S9, the processing component 110 controls the display component to display the display image. In one embodiment, the size of the display image is equal to the display resolution of the display component 130.

It should be noted that, in some embodiment, the second application and/or the third application may be omitted, and the operations corresponding thereto may also be omitted or varied.

Through such operations, the memory 120 can allocate an adjusted memory space for one of the applications APP1-APP3, so that the memory consumption of the applications can be reduced.

To allow the disclosure to be more fully understood, an illustrative example is described in the paragraphs below, but the present disclosure is not limited to the example below.

Figure 3:
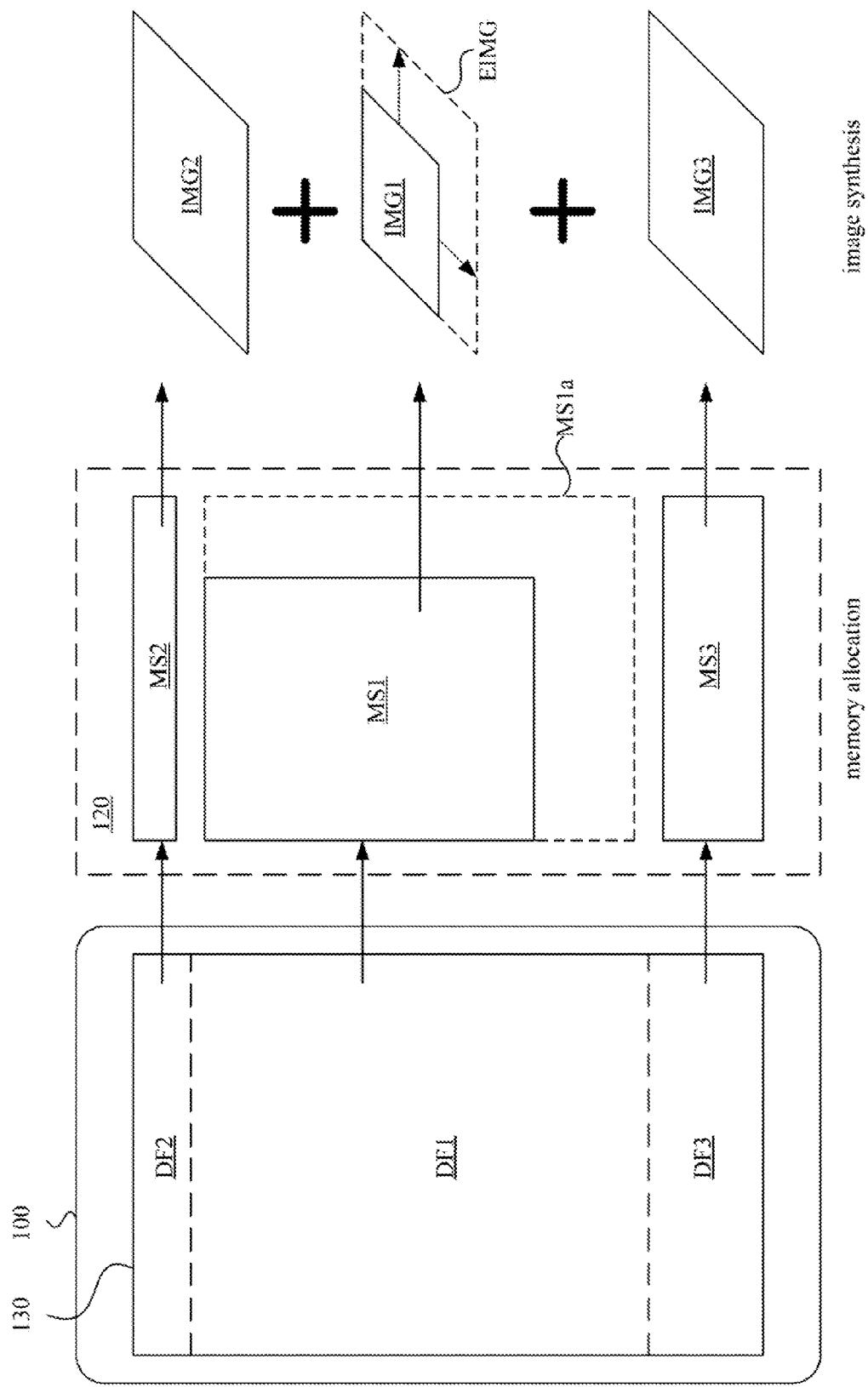
FIG. 3 illustrates an illustrative example of a display method in accordance with one embodiment of the present disclosure.

Reference is made to FIG. 3. In this illustrative example, three applications APP1-APP3 are executed. In this case, the display resolution of the display component 130 may be, for example, a size of 2560*1440. The default size of the destination frame DF1 of the application APP1 may be, for example, a size of 2000*1440. The default size of the destination frame DF2 of the application APP2 may be, for example, a size of 200*1440. The default size of the destination frame DF3 of the application APP3 may be, for example, a size of 360*1440.

In this illustrative example, the processing component 110 requests the memory 120 to allocate the memory spaces MS2, MS3 for the second application APP2 and the third application APP3 according to the default sizes of the destination frames DF2, DF3, respectively. In addition, the processing component 110 requests the memory 120 to allocate the memory space MS1 for the first application APP1 according to an adjusted size of 1500*1080 reduced from the default size of the destination frame DF1 of the first application APP1, instead of requesting the memory space MS1a according to the default size of the destination frame DF1 of the first application APP1

Subsequently, the application APP1 generates application image IMG1 with the adjusted size in the memory space MS1. The application APP2 generates application image IMG2 with the default size of the destination frame DF2 in the memory space MS2. The application APP3 generates application image IMG3 with the default size of the destination frame DF3 in the memory space MS3.

Subsequently, the processing component 110 enlarges the application image IMG1 to an enlarged image EMIG with a size of 2000*1440, which is identical to the size of the default size of the destination frame DF1. After that, the processing component 110 combines the enlarged image EMIG with a size of 2000*1440, the application image IMG2 with a size of 200*1440, and the application image IMG3 with a size of 360 1440 to generate a display image with a size of 2560*1440, which is identical to the resolution of the display component. After that, the processing component 110 controls the display component 130 to display the display image.

Through such operations, the memory 120 can allocate the adjusted memory space MS1a to one of the applications APP1, so that the memory consumption of the application APP1 can be reduced.

In some embodiments of the present disclosure, the processing component 110 may determine whether to request an adjusted memory space in response to at least one status of the mobile device 100.

Figure 4:
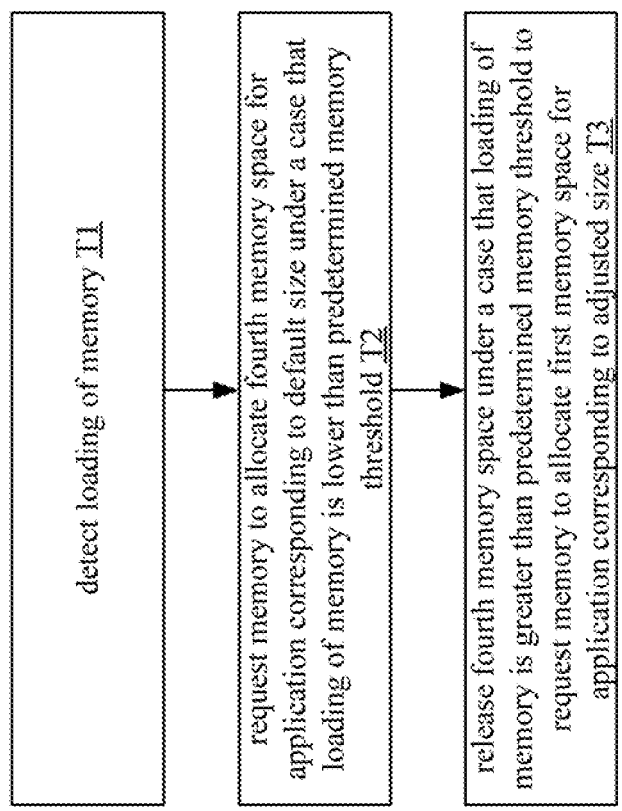
FIG. 4 is a flowchart of a part of a display method in accordance with another embodiment of the present disclosure.

For example, referring to FIG. 4, in operation T1, the processing component 110 detects a loading of the memory 120. In operation T2, before the first memory space described above is allocated to the first application (i.e., before operation S2 described above), the processing component 110 determines whether the loading of the memory 120 is lower than a predetermined memory threshold (e.g., 80%), In response to the case that the loading of the memory 120 is lower than the predetermined memory threshold, the processing component 110 requests the memory 120 to allocate a fourth memory space for the first application corresponding to the first default size, which the fourth memory space is greater than the first memory space described above, so that the first application image used to generate the display image has the first default size.

In operation T3, after the fourth memory space is allocated to the first application, when the loading of the memory 120 is greater than the predetermined memory threshold (e.g., 80%), the processing component 110 releases the fourth memory space and request the memory 120 to allocate the first memory space described above for the first application corresponding to the first adjusted size. Subsequently, the operations S3-S9 may be executed.

Also, in some embodiments, after the first memory space is allocated to the first application, when the loading of the memory 120 is lower than another predetermined memory threshold (e.g., 60%), the processing component 110 may release the first memory space and request the memory 120 to allocate a fifth memory space corresponding to the first default size for the first application.

Moreover, in some embodiments, after the first memory space is allocated to the first application, when the loading of the memory 120 is greater than another predetermined memory threshold (e.g., 90%), the processing component 110 may release the first memory space and request the memory 120 to allocate a sixth memory space corresponding to a second adjusted size adjusted from the first default size for the first application, in which the sixth memory space is smaller than the first memory space described above, so that the memory consumption of the first application can be further reduced.

Figure 5:
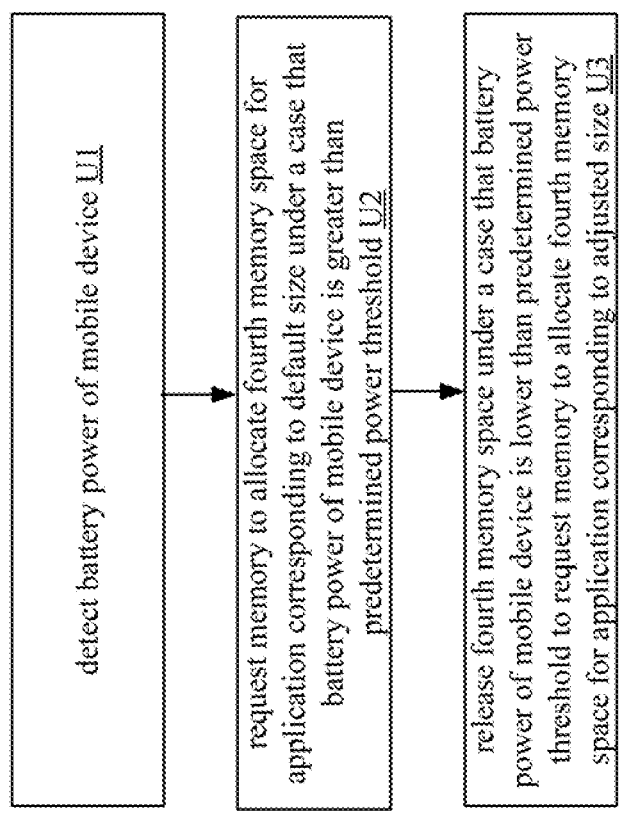
FIG. 5 is a flowchart of a part of a display method in accordance with another embodiment of the present disclosure.

As another example, referring to FIG. 5, in operation U1, the processing component 110 detects a battery power of the mobile device 100. In operation U2, before the first memory space described above is allocated to the first application (i.e., before operation S2 described above), the processing component 110 determines whether the battery power of the mobile device 100 is greater than a predetermined power threshold (e.g., 50%). In response to the case that the battery power of the mobile device 100 is greater than the predetermined power threshold, the processing component 110 requests the memory 120 to allocate a fourth memory space for the first application corresponding to the first default size, which the fourth memory space is greater than the first memory space described above, so that the first application image used to generate the display image has the first default size.

In operation U3, after the fourth memory space is allocated to the first application, when the battery power of the mobile device 100 is lower than the predetermined power threshold (e.g., 50%), the processing component 110 releases the fourth memory space and request the memory 120 to allocate the first memory space described above for the first application corresponding to the first adjusted size. Subsequently, the operations S3-S9 may be executed.

Also, in some embodiments, after the first memory space is allocated to the first application, when the battery power of the mobile device 100 is greater than another predetermined power threshold, (e.g., 80%) the processing component 110 may release the first memory space and request the memory 120 to allocate a fifth memory space corresponding to the first default size for the first application.

Moreover, in some embodiments, after the first memory space is allocated to the first application, when the loading of the memory 120 is greater than another predetermined power threshold (e.g., 300%), the processing component 110 may release the first memory space and request the memory 120 to allocate a sixth memory space corresponding to a second adjusted size adjusted from the first default size for the first application, in which the sixth memory space is smaller than the first memory space described above, so that the memory consumption of the first application can be further reduced.

Through such operations, the mobile device 100 can adjust memory consumption and power consumption on the basis of actual statuses thereof.

Although the present invention has been described in considerable detail with reference to certain embodiments thereof, other embodiments are possible. Therefore, the scope of the appended claims should not be limited to the description of the embodiments contained herein.

What is claimed is:

1. A mobile device comprising:
   a memory;
   a display component; and
   a processing component electrically connected to the memory and the display component, wherein the processing component is configured to:
   execute a first application, a second application, a window manager, and an image synthesizer;
   determine, through the window manager, a first default size of a first destination frame of the first application and a second default size of a second destination frame of the second application;
   request, through the window manager, the memory to allocate a first memory space for the first application corresponding to a first adjusted size adjusted from the first default size;
   request, through the window manager, the memory to allocate a second memory space for the second application corresponding to the second default size;
   generate, through the first application, a first application image with the first adjusted size in the first memory space;
   generate, through the second application, a second application image with the second default size in the second memory space;
   synthesize, through the image synthesizer, the first application image with the first adjusted size and the second application image with the second default size to generate a display image;
   control the display component to display the display image; and
   release a third memory space for the first application corresponding to the first default size to request the memory to allocate the first memory space for the first application corresponding to the first adjusted size under a case that a loading of the memory is greater than a predetermined memory threshold or under a case that a battery power of the mobile device is lower than a predetermined power threshold before requesting the memory to allocate the first memory space for the first application.

2. The mobile device as claimed in claim 1, wherein the processing component is further configured to:
   enlarge, through the image synthesizer, the first application image to generate an enlarged image; and
   compose, through the image synthesizer, the display image by combining the enlarged image and the second application image.

3. The mobile device as claimed in claim 1, wherein the processing component is further configured to:
   provide, through the window manager, scalable information for the first application;
   provide, through the first application, an adjusting ratio to the window manager in response to the scalable information; and
   calculate, through the window manager, the first adjusted size according to the first default size and the adjusting ratio.

4. The mobile device as claimed in claim 3, wherein the processing component is further configured to:
   provide, through the window manager, the adjusting ratio to the image synthesizer;
   enlarge, through the image synthesizer, the first application image to generate an enlarged image according to the adjusting ratio; and
   compose, through the image synthesizer, the display image by combining the enlarged image and the second application image.

5. The mobile device as claimed in claim 4, wherein the first default size is equal to a size of the enlarged image.

6. The mobile device as claimed in claim 1, wherein the processing component is further configured to:
   detect the loading of the memory; and
   request the memory to allocate the third memory space for the first application corresponding to the first default size under a case that the loading of the memory is lower than the predetermined memory threshold before requesting the memory to allocate the first memory space for the first application.

7. The mobile device as claimed in claim 1, wherein the processing component is further configured to:
   detect the battery power of the mobile device; and
   request the memory to allocate the third memory space for the first application corresponding to the first default size under a case that the battery power of the mobile device is greater than the predetermined power threshold before requesting the memory to allocate the first memory space for the first application.

8. A display method comprising:
   executing a first application, a second application, a window manager, and an image synthesizer;
   determining, through the window manager, a first default size of a first destination frame of the first application and a second default size of a second destination frame of the second application;

requesting, through the window manager, a memory to allocate a first memory space for the first application corresponding to a first adjusted size adjusted from the first default size;

requesting, through the window manager, the memory to allocate a second memory space for the second application corresponding to the second default size;

generating, through the first application, a first application image with the first adjusted size in the first memory space;

generating, through the second application, a second application image with the second default size in the second memory space;

synthesizing, through the image synthesizer, the first application image with the first adjusted size and the second application image with the second default size to generate a display image;

controlling a display component to display the display image; and releasing a third memory space for the first application corresponding to the first default size to request the memory to allocate the first memory space for the first application corresponding to the first adjusted size under a case that a battery power of a mobile device is lower than a predetermined power threshold or under a case that a loading of the memory is greater than a predetermined memory threshold before requesting the memory to allocate the first memory space for the first application.

9. The display method as claimed in claim 8, wherein the operation of synthesizing the first application image with the first adjusted size and the second application image with the second default size to generate the display image comprises:

enlarging, through the image synthesizer, the first application image to generate an enlarged image; and composing, through the image synthesizer, the display image by combining the enlarged image and the second application image.

10. The display method as claimed in claim 8 further comprising:

providing, through the window manager, scalable information to the first application;

providing, through the first application, an adjusting ratio to the window manager in response to the scalable information; and calculating, through the window manager, the first adjusted size according to the first default size and the adjusting ratio.

11. The display method as claimed in claim 10 further comprising:

providing, through the window manager, the adjusting ratio to the image synthesizer;

wherein the operation of synthesizing the first application image with the first adjusted size and the second application image with the second default size to generate the display image comprises:

enlarging, through the image synthesizer, the first application image to generate an enlarged image according to the adjusting ratio; and composing, through the image synthesizer, the display image by combining the enlarged image and the second application image.

12. The display method as claimed in claim 11, wherein the first default size is equal to a size of the enlarged image.

13. The display method as claimed in claim 8 further comprising:

detecting the loading of the memory; and requesting the memory to allocate the third memory space for the first application corresponding to the first default size under a case that the loading of the memory is lower than the predetermined memory threshold before requesting the memory to allocate the first memory space for the first application.

14. The display method as claimed in claim 8 further comprising:

detecting the battery power of the mobile device; and requesting the memory to allocate the third memory space for the first application corresponding to the first default size under a case that the battery power of the mobile device is greater than the predetermined power threshold before requesting the memory to allocate the first memory space for the first application.

15. A non-transitory computer readable storage medium for storing a computer program, which, when executed, causes a processing component to perform operations comprising:

executing a first application, a second application, a window manager, and an image synthesizer;

determining, through the window manager, a first default size of a first destination frame of the first application and a second default size of a second destination frame of the second application;

requesting, through the window manager, a memory to allocate a first memory space for the first application corresponding to a first adjusted size adjusted from the first default size;

requesting, through the window manager, the memory to allocate a second memory space for the second application corresponding to the second default size;

generating, through the first application, a first application image with the first adjusted size in the first memory space;

generating, through the second application, a second application image with the second default size in the second memory space;

synthesizing, through the image synthesizer, the first application image with the first adjusted size and the second application image with the second default size to generate a display image;

controlling a display component to display the display image; and releasing a third memory space for the first application corresponding to the first default size to request the memory to allocate the first memory space for the first application corresponding to the first adjusted size under a case that a battery power of a mobile device is lower than a predetermined power threshold or under a case that a loading of the memory is greater than a predetermined memory threshold before requesting the memory to allocate the first memory space for the application.

16. The non-transitory computer readable storage medium as claimed in claim 15, wherein the operation of synthesizing the first application image with the first adjusted size and the second application image with the first default size to generate the display image comprises:

enlarging, through the image synthesizer, the first application image to generate an enlarged image; and composing, through the image synthesizer, the display image by combining the enlarged image and the second application image.

17. The non-transitory computer readable storage medium as claimed in claim 15, the operations further comprising:

providing, through the window manager, scalable information for the first application;
providing, through the first application, an adjusting ratio to the window manager in response to the scalable information; and
calculating, through the window manager, the first adjusted size according to the first default size and the adjusting ratio.

18. The non-transitory computer readable storage medium as claimed in claim 17, the operations further comprising:
providing, through the window manager, the adjusting ratio to the image synthesizer;
wherein the operation of synthesizing the first application image with the first adjusted size and the second application image with the first default size to generate the display image comprises:
enlarging, through the image synthesizer, the first application image to generate an enlarged image according to the adjusting ratio; and
composing, through the image synthesizer, the display image by combining the enlarged image and the second application image.

19. The non-transitory computer readable storage medium as claimed in claim 15, the operations further comprising:
detecting the loading of the memory; and
requesting the memory to allocate the third memory space for the first application corresponding to the first default size under a case that the loading of the memory is lower than the predetermined memory threshold before requesting the memory to allocate the first memory space for the first application.

20. The non-transitory computer readable storage medium as claimed in claim 15, the operations further comprising:
detecting the battery power of the mobile device; and
requesting the memory to allocate the third memory space for the first application corresponding to the first default size under a case that the battery power of the mobile device is greater than the predetermined power threshold before requesting the memory to allocate the first memory space for the first application.

* * * * *